United States Patent
Yu et al.

(10) Patent No.: US 9,880,420 B2
(45) Date of Patent: Jan. 30, 2018

(54) OPTICAL FILM, METHOD FOR MANUFACTURING SAME, AND LIQUID CRYSTAL DISPLAY INCLUDING SAME

(71) Applicant: CHEIL INDUSTRIES INC., Gumi-si, Gyeongsangbuk-do (KR)

(72) Inventors: So Hee Yu, Uiwang-si (KR); Jin Hui Cho, Uiwang-si (KR); Jong Kyu Choi, Uiwang-si (KR); Ran Kim, Uiwang-si (KR); Seung Kyu Lee, Uiwang-si (KR); Jong Hyuk Eun, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 224 days.

(21) Appl. No.: 14/416,241

(22) PCT Filed: Jul. 3, 2013

(86) PCT No.: PCT/KR2013/005898
§ 371 (c)(1),
(2) Date: Jan. 21, 2015

(87) PCT Pub. No.: WO2014/017754
PCT Pub. Date: Jan. 30, 2014

(65) Prior Publication Data
US 2015/0185559 A1    Jul. 2, 2015

(30) Foreign Application Priority Data

Jul. 25, 2012    (KR) .......................... 10-2012-0081495

(51) Int. Cl.
*G02F 1/13363*    (2006.01)
*G02F 1/1335*    (2006.01)
(Continued)

(52) U.S. Cl.
CPC ......... *G02F 1/133634* (2013.01); *G02B 1/10* (2013.01); *G02F 1/13363* (2013.01);
(Continued)

(58) Field of Classification Search
CPC ........... G02F 1/133528; G02F 1/13363; G02F 1/133634
See application file for complete search history.

(56) References Cited

U.S. PATENT DOCUMENTS 6,819,381 B2 * 11/2004 Mi ...................... G02B 5/3016
349/117
7,088,511 B2    8/2006 Trapani et al.
(Continued)

FOREIGN PATENT DOCUMENTS

CN    1950732 A    4/2007
CN    101473253 A    7/2009
(Continued)

OTHER PUBLICATIONS

International Search Report of Corresponding PCT/KR2013/005898, dated Oct. 18, 2013, 5 pages.

*Primary Examiner* — Dung Nguyen
(74) *Attorney, Agent, or Firm* — Lewis Roca Rothgerber Christie LLP (57) ABSTRACT

Disclosed are an optical film, a method for preparing the same, and a liquid crystal display including the same. The optical film is a single film of a non-liquid crystalline thermoplastic resin, and includes: first and second surface part placed on both surfaces of the film in a thickness direction; and an inner part of the film placed between the first and second surface part, wherein the first and second surface part are not aligned with a tilt in the thickness direction, and the inner part of the film is aligned with a tilt in the thickness direction.

18 Claims, 6 Drawing Sheets

(51) Int. Cl.
  *G02B 1/10*  (2015.01)
  *G02B 5/30*  (2006.01)
  *B29C 55/08*  (2006.01)
  *B29C 47/00*  (2006.01)

(52) U.S. Cl.
  CPC .... *G02F 1/133528* (2013.01); *B29C 47/0021* (2013.01); *B29C 47/0057* (2013.01); *B29C 55/08* (2013.01); *G02B 5/3083* (2013.01); *G02F 1/133632* (2013.01); *G02F 2001/133638* (2013.01); *Y10T 428/10* (2015.01); *Y10T 428/31* (2015.01)

(56) References Cited

U.S. PATENT DOCUMENTS

| | | |
|---|---|---|
| 2006/0257649 A1 | 11/2006 | Kawamoto et al. |
| 2008/0303995 A1 | 12/2008 | Shimodaira et al. |
| 2009/0096970 A1 | 4/2009 | Sakai et al. |
| 2010/0026940 A1 | 2/2010 | Takegami et al. |
| 2011/0317101 A1* | 12/2011 | Cho .................. C08J 7/04 349/96 |

FOREIGN PATENT DOCUMENTS

| | | |
|---|---|---|
| CN | 101704287 A | 5/2010 |
| JP | 2005-202313 | 7/2005 |
| JP | 2005-352404 A | 12/2005 |
| JP | 2009-276533 | 11/2009 |
| KR | 2002-0036311 | 5/2002 |

\* cited by examiner

OPTICAL FILM, METHOD FOR MANUFACTURING SAME, AND LIQUID CRYSTAL DISPLAY INCLUDING SAME

CROSS-REFERENCE TO RELATED APPLICATIONS

This application is a National Phase Patent Application and claims priority to and the benefit of International Application Number PCT/KR2013/005898, filed on Jul. 3, 2013, which claims priority to Korean Patent Application Number 10-2012-0081495, filed on Jul. 25, 2012, the entire contents of all of which are incorporated herein by reference.

TECHNICAL FIELD

The present invention relates to an optical film, a method for preparing the same and a liquid crystal display including the same. More particularly, the present invention relates to an optical film, which has tilted alignment in an inner part of the film without generating tilted alignment on a surface thereof to increase viewing angle and to prevent light leakage generated in compensation for liquid crystals, a method for preparing the same, and a liquid crystal display including the same.

BACKGROUND ART

Recently, liquid crystal displays (LCDs) are the most widely used among flat panel displays. Generally, a liquid crystal display has a structure in which a liquid crystal layer is embedded between a thin film transistor (TFT) array substrate and a color filter substrate. When an electric field is applied to electrodes placed on the array substrate and the color filter substrate, an array of liquid crystal molecules of the liquid crystal layer between the above two substrates is changed, whereby an image can be displayed. Polarizing films (polarizing plates) are disposed on outer surfaces of the array substrate and the color filter substrate. The polarizing film can control polarization by allowing selective transmittance of light, which travels in a certain direction among light emitted from a backlight and light passing through a liquid crystal layer. Generally, a polarizing plate includes a polarizer capable of polarizing light in a certain direction, a protective layer, and a compensation film.

Due to the anisotropic refractivity of liquid crystals, a liquid crystal display has fundamental problems relating to viewing angle. Thus, wide viewing angle technologies, such as vertical alignment (VA) modes, horizontal alignment modes (IPS, FFS), and the like, which can improve viewing angle of typical TN (twisted nematic) modes, are widely employed in the art.

Although liquid crystals of the horizontal alignment mode have a disadvantage of slow response time, the horizontal alignment mode has advantages of excellent contrast and excellent viewing angle at tilt angles. On the contrary, although liquid crystals of the vertical alignment mode have advantages of fast response time and excellent contrast when viewed from front, the vertical alignment mode provides unsatisfactory viewing angle due to severe change in polarization state at tilt angles. Therefore, for a liquid crystal display employing liquid crystals in the vertical alignment mode, it is very important to have improved viewing angle, and a compensation film is essential for improved viewing angle.

Although viewing angle-compensation films aligned in a thickness direction have been developed, these films have a structure wherein tilted alignment is formed from a film surface to the interior of the film, thereby causing degradation of contrast ratio (CR).

DISCLOSURE

Technical Problem

An object of the present invention is to provide an optical film, which is formed of a single film without separate coating to have tilted alignment in an inner part of the film without generating tilted alignment on a surface thereof, and a method for preparing the same.

Another object of the present invention is to provide an optical film, which can significantly improve viewing angle of a liquid crystal display, a method for preparing the same, and a liquid crystal display including the same.

A further object of the present invention is to provide an optical film, which can prevent light leakage such as moiré generated in compensation for liquid crystals, a method for preparing the same, and a liquid crystal display including the same.

The aforementioned and other objects of the present invention will be achieved by the present invention as described below.

Technical Solution

One aspect of the present invention relates to an optical film. The optical film is a single film of a non-liquid crystalline thermoplastic resin and includes: first and second surface part placed on both surfaces of the film in a thickness direction; and an inner part of the film placed between the first and second surface part, wherein the first and second surface part are not aligned with a tilt in the thickness direction, and the inner part of the film is aligned with a tilt in the thickness direction.

Each of the first and second surface part may have a thickness of 1 µm to 20 µm from the surface thereof.

The first and second surface part may occupy 1% to 30% of a total thickness of the optical film.

The inner part of the film may have a film β angle of 5° to 35°, as defined as an angle at which transmittance under crossed nicols is minimized.

The inner part of the film may have a thickness of 5 µm to 100 µm.

The inner part of the film may have a ratio of a maximum β angle (β1) to a minimum β angle (β2) (β1/β2) of 1:1 to 7:1. The thermoplastic resin may include at least one of cycloolefin resins, polycarbonate resins, polyolefin resins, aromatic vinyl resins, polyamide resins, polyimide resins, polyester resins, and acrylic resins.

The optical film may have an in-plane retardation value (Ro') of 20 nm to 110 nm at a wavelength of 550 nm, as defined by Equation 1:

$$Ro'=(nx-ny')\times d, \qquad \text{[Equation 1]}$$

wherein nx and ny' are refractive indices in x-axis and y'-axis directions, respectively, and d is film thickness.

The optical film may have an out-of-plane retardation value (Rth') of 80 nm to 190 nm at a wavelength of 550 nm, as defined by Equation 2:

$$Rth'=[(nx+ny')/2-nz']\times d, \qquad \text{[Equation 2]}$$

wherein nx, ny' and nz' are refractive indices in x-axis, y'-axis and z'-axis directions, respectively, and d is film thickness.

The optical film may have a thickness of 30 µm to 110 µm.

Another aspect of the present invention relates to a liquid crystal display including the optical film.

The liquid crystal display includes: a polarizing film; and the optical film stacked on the polarizing film.

The liquid crystal display may further include a liquid crystal layer placed on the other side of the optical film.

A further aspect of the present invention relates to a method for preparing an optical film. The method includes: melt extruding a non-liquid crystalline thermoplastic resin; and passing the melt extruded thermoplastic resin between a first roll and a second roll to form a film, wherein the first and second rolls have a surface temperature less than a glass transition temperature of the thermoplastic resin, and impart a tilt angle to an inner part of the film by generating different shear force on a surface of the film and in an interior of the film depending on operation of the first and second rolls.

The first and second rolls may have a surface temperature (Tr) satisfying Equation 3:

$$Te \times 0.4 < Tr < Te \times 0.5,$$ [Equation 3]

wherein Te is a temperature of the thermoplastic resin immediately after melt extrusion, and Tr is a surface temperature of the rolls.

In one embodiment, the first and second rolls may have different elasticities.

In one embodiment, the method may further include stretching the thermoplastic resin having passed between the first and second rolls.

The thermoplastic resin may be stretched in a transverse direction (TD) by 5% to 20% relative to a machine direction.

The thermoplastic resin may be stretched at a temperature less than a glass transition temperature.

Advantageous Effects

According to the present invention, the optical film is formed without separate coating process to have tilted alignment in an inner part of the film without generating tilted alignment on a surface part thereof, thereby significantly improving viewing angle of a liquid crystal display while preventing light leakage such as moiré in compensation of liquid crystals.

BEST MODE

Embodiments of the invention will now be described with reference to the accompanying drawings.

Optical Film

Figure 1:
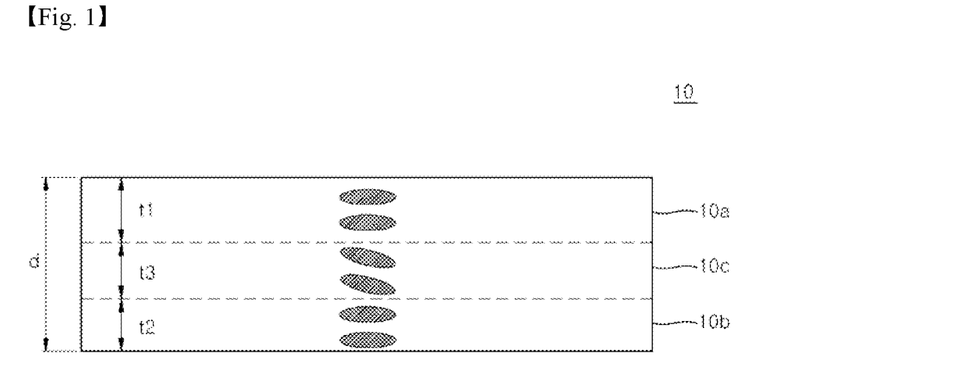
FIG. 1 is a schematic sectional view of an optical film according to one embodiment of the present invention.

FIG. 1 is a schematic sectional view of an optical film according to one embodiment of the present invention. Referring to FIG. 1, the optical film 10 according to the embodiment includes: first and second surface part 10a, 10b placed on both surfaces of the film in a thickness direction; and an inner part of the film 10c placed between the first and second surface part, wherein the first and second surface part 10a, 10b are not aligned with a tilt in the thickness direction, and the inner part of the film 10c is aligned with a tilt in the thickness direction.

The optical film 10 is a single film formed of a non-liquid crystalline thermoplastic resin.

In one embodiment, the optical film 10 may be formed of any transparent thermoplastic resin which can be extruded. In one embodiment, the thermoplastic resin may be cycloolefin resins, polycarbonate resins, polyolefin resins, aromatic vinyl resins, polyamide resins, polyimide resins, polyester resins, acrylic resins, and combination thereof.

As used herein, the term "single film" means that a surface part of the film and an inner part of the film are formed by extrusion without additional coating layers, adhesive layers, or the like. Specifically, any adhesive layer or coating layer is not formed between each of the first and second surface part 10a, 10b and the inner part of the film 10c. Further, the first and second surface part and the inner part of the film have the same composition and are classified according to an alignment manner for convenience.

Since the optical film according to the invention has different alignments on the surface thereof and in the interior thereof, the optical film may improve viewing angle and light leakage properties, and the like. In addition, since the optical film having different alignments on the surface thereof and in the interior thereof may be prepared by a single extrusion process, it is possible to simplify the manufacturing process while reducing manufacturing costs.

Each of the first and second surface part 10a, 10b may have a thickness (t1 or t2) from 1 µm to 20 µm, preferably from 3 µm to 10 µm. Within this range, the optical film can secure an excellent viewing angle.

In addition, the first and second surface part occupy 1% to 30% of the total film thickness. Within this range, the optical film can secure an excellent viewing angle.

The inner part of the film 10c may have a thickness (t3) from 5 µm to 100 µm, preferably from 10 µm to 65 µm.

Figure 2:
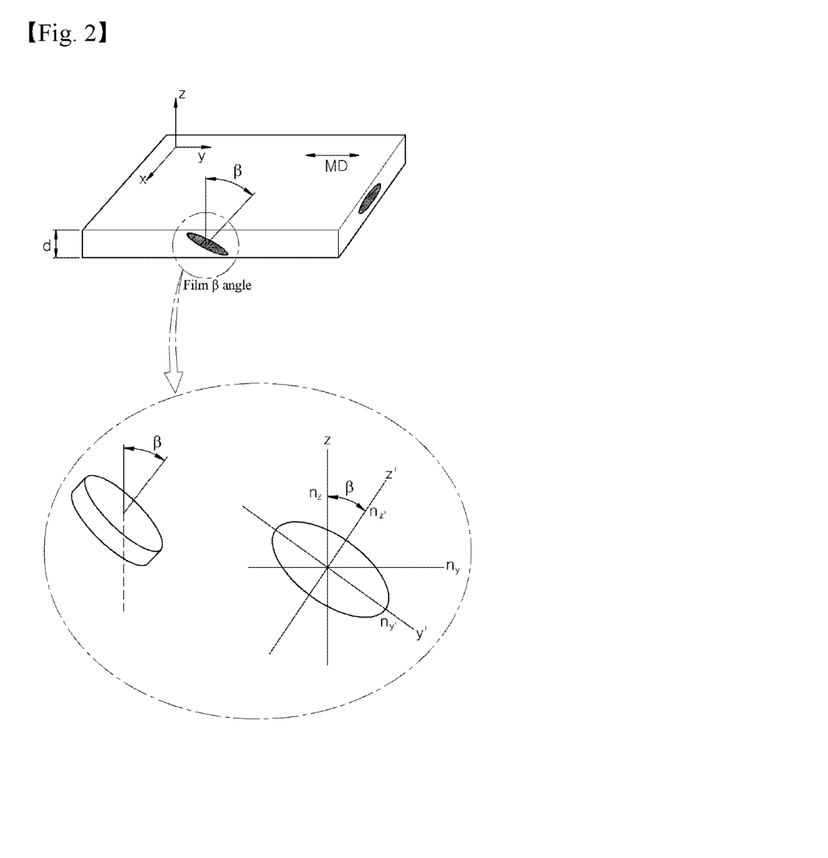
FIG. 2 is a diagram explaining a film β angle.

FIG. 2 is a diagram explaining a film β angle. The inner part of the film 10c may have a film β angle of 5° to 35°, as defined as an angle at which transmittance under crossed nicols condition is minimized. The film β angle is the same as the fragment alignment angle, and is an angle formed relative to the z-axis in the thickness direction and a z'-axis perpendicular to an alignment plane. The film β angle is an angle at which transmittance under the crossed nicols is minimized when observing crossed nicols after placing the film between polarizing plates.

The inner part of the film 10c may have different film β angles depending on a position on the z-axis in the thickness direction. For example, at a position of 10 µm to 20 µm from the film surface, the film may have a film β angle of 21° to 27°, and at a position of 70 µm to 80 µm from the film surface, the film may have a film β angle of 15° to 20°. As such, the inner part of the film has different tilted alignments and thus has different distributions of the film β angle depending on film thickness. Preferably, the inner part of the film has a ratio of a maximum β angle (β1) to a minimum β angle (β2) (β1/β2) from 1.0 to 7.0, more preferably from about 1.0 to about 1.8, for example, from about 1.05 to about 1.5. Within this range, the optical film can exhibit excellent enhancement in viewing angle.

The optical film may have an in-plane retardation value (Ro') from 20 nm to 110 nm at a wavelength of 550 nm, as defined by Equation 1:

$$Ro'=(nx-ny')\times d, \quad \text{[Equation 1]}$$

wherein nx and ny' are refractive indices in x-axis and y'-axis directions, respectively, and d is film thickness.

Within this range, the optical film has an advantage of viewing angle compensation. Preferably, the optical film has an in-plane retardation value (Ro') from 50 nm to 100 nm.

The optical film may have an out-of-plane retardation value (Rth') from 80 nm to 190 nm at a wavelength of 550 nm, as defined by Equation 2:

$$Rth'=[(nx+ny')/2-nz']\times d, \quad \text{[Equation 2]}$$

wherein nx, ny' and nz' are refractive indices in x-axis, y'-axis and z'-axis directions, respectively, and d is film thickness.

Within this range, the optical film has an advantage of enhancement of viewing angle. Preferably, the optical film has an out-of-plane retardation value (Rth') from 120 nm to 180 nm.

In one embodiment, the optical film may have a thickness (d) from 30 μm to 110 μm, preferably from 50 μm to 100 μm.

Figure 3:
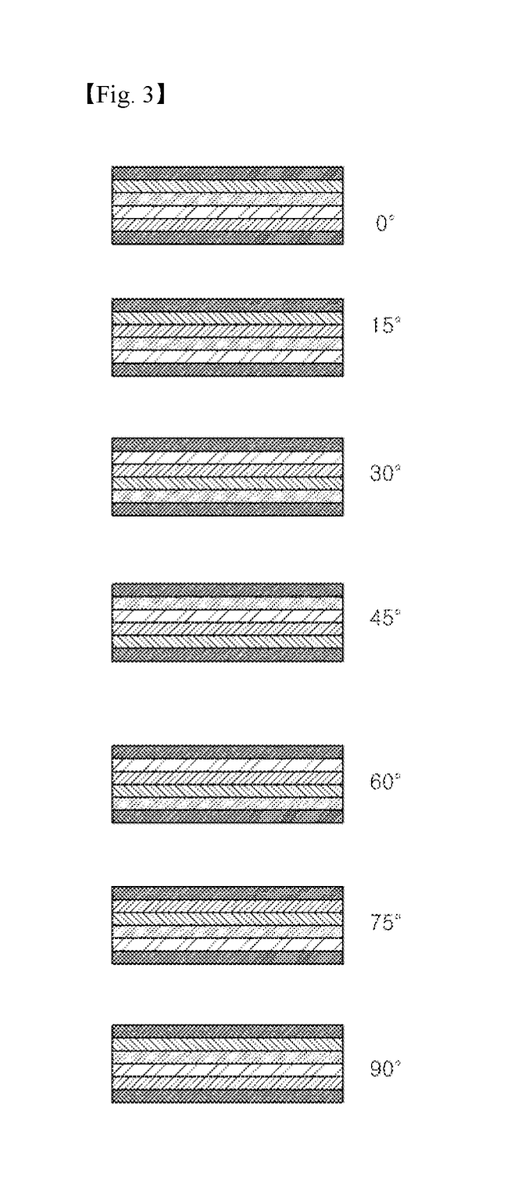
FIG. 3 shows schematic views of polarizing microscope images depending on a rotation angle upon rotating an optical film according to one embodiment of the present invention, placed between crossed nicols polarizing plates, from 0° to 90°.

FIG. 3 shows schematic views of polarizing microscope images depending on a rotation angle upon rotating an optical film according to one embodiment of the invention, placed between crossed nicols polarizing plates, from 0° to 90°. In FIG. 3, a black area refers to the darkest state (an extinction position) under crossed nicols. As shown in FIG. 3, it can be seen that the surface of the film has extinction positions at any angle, and the inner part of the film of the film has no extinction positions and is aligned depending on film thickness.

Method for Preparing Optical Film

Another aspect of the invention relates to a method for preparing an optical film. The method includes: melt extruding a non-liquid crystalline thermoplastic resin; and passing the melt extruded thermoplastic resin between a first roll and a second roll to form a film, wherein the first and second rolls have a surface temperature less than a glass transition temperature (Tg) of the thermoplastic resin, and impart a tilt angle to an inner part of the film by generating different shear force on a surface of the film and in an interior of the film depending on operation of the first and second rolls.

Figure 4:
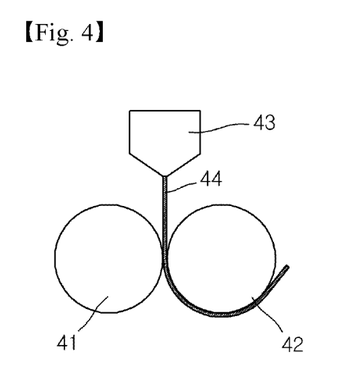
FIG. 4 is a schematic view of a process for preparing an optical film according to one embodiment of the present invention.

FIG. 4 is a schematic view of a process for preparing an optical film according to one embodiment. As shown in FIG. 4, a thermoplastic resin 44 melt extruded from a die 43 is passed between a first roll 41 and a second roll 42 to form a film. Here, the second roll 42 is a roll upon which the melt extruded thermoplastic resin 44 is wound.

In this way, when the melt extruded thermoplastic resin contacts the rolls to form a film, the film has an inner temperature exceeding a glass transition temperature Tg of the thermoplastic resin, and a surface temperature less than the glass transition temperature Tg. That is, the inner temperature and the surface temperature of the film are different. When the rolls at both ends of the film are driven at different forming temperatures on the surface and at the interior of the film, different shear force is generated on the surface and at the interior of the film, whereby the film can have a tilt angle in the thickness direction.

In one embodiment, the first and second rolls 41, 42 may have a surface temperature (Tr), which satisfying Equation 3:

$$Te\times 0.4 < Tr < Te\times 0.5 \quad \text{[Equation 3]}$$

wherein Te is the temperature of the thermoplastic resin immediately after melt extrusion, and Tr is the surface temperature of the rolls.

When the surface temperature of each of the first and second rolls 41, 42 deviates from this range, it is difficult for the film to have a structure wherein only the inner part of the film is aligned with a tilt and the surface are not aligned.

In one embodiment, the first and second rolls 41, 42 may have different elasticities to provide various film β angles. For example, the first roll 41 may have greater elasticity than the second roll 42. In one embodiment, the first and second rolls may be provided in the form of various combinations, such as a rubber roll+an FSR roll, an FSR roll+an FSR roll, an SFR roll+an FSR roll, a metal roll+an FSR roll, an SFR roll+an SFR roll, a metal roll+a rubber roll, and the like. The FSR roll has a structure wherein a water layer and a steel layer are sequentially formed on a surface of a metal roll, and the SFR roll has a structure wherein a rubber layer and a steel layer are sequentially formed on a surface of a metal roll.

In addition, the first and second rolls 41, 42 may have different rotating rates. For example, the first roll 41 may be driven at a higher rotating speed than the second roll 42. In one embodiment, the first roll may be driven at a rotating speed of 0.9 times to 1.2 times the rotating speed of the second roll, for example, at a rotating speed of 1.05 times to 1.2 times the rotating speed of the second roll.

The method may further include stretching the thermoplastic resin having passed between the first and second rolls 41, 42. In one embodiment, the thermoplastic resin may be bi-axially stretched, and may be stretched in a transverse direction (TD) by 5% to 20% relative to a machine direction. Within this range, the optical film can secure in-plane retardation (Ro') and thickness retardation (Rth') properties. Preferably, the resin is stretched in the transverse direction (TD) by 8% to 15% relative to the machine direction.

The resin may be stretched at a lower temperature than the glass transition temperature (Tg) thereof. For example, the resin may be stretched at a 1° C. to 20° C. lower temperature, preferably at a 5° C. to 15° C. lower temperature, than the glass transition temperature (Tg) thereof. Within this range, the optical film can provide increased contrast ratio.

After the resin is stretched, the film can undergo reduction in film β angle as compared with the film β angle immediately after melt extrusion. In one embodiment, the film β angle of the film after stretching may be 1° to 20° smaller than the film β angle of the film immediately after melt extrusion.

Liquid Crystal Display

A further aspect of the present invention relates to a liquid crystal display. Since the optical film has the surface without tilted alignment and the inner part of the film with tilted alignment, the optical film can secure excellent viewing angle even in liquid crystals of a vertical alignment mode, and can prevent light leakage such as moiré generated in compensating for liquid crystals by using a polymeric film having a low coefficient of photo-elasticity.

In one embodiment, the liquid crystal display includes a polarizing film; and the optical film stacked on the polarizing film.

Figure 5:
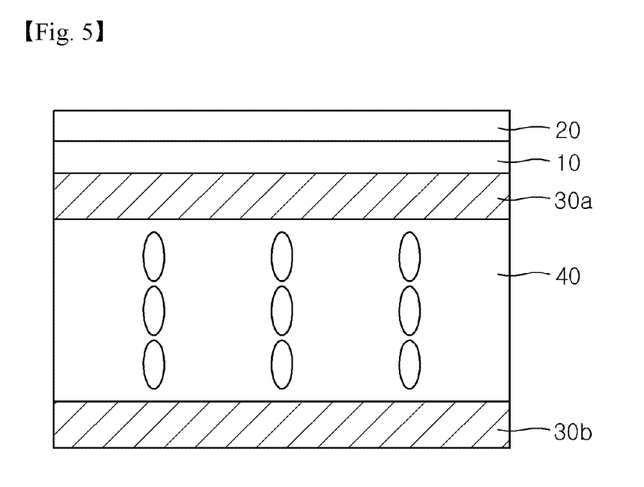
FIG. 5 is a schematic sectional view of a liquid crystal display according to one embodiment of the present invention.

The liquid crystal display may further include a liquid crystal layer on the other surface of the optical film. FIG. 5 is a schematic sectional view of a liquid crystal display according to one embodiment. As shown in FIG. 5, the liquid crystal display includes a liquid crystal panel including a liquid crystal layer 40 embedded between a first substrate 30a and a second substrate 30b, wherein the optical film 10 may be stacked on one surface (an upper surface) of the first substrate 30a. Herein, the terms "upper" and "lower" are defined with reference to the drawings and may also be interpreted as "lower" and "upper" according to orientations, respectively. In one embodiment, the first substrate 30a may be a color filter (CF) substrate (upper substrate) and the second substrate 30b may be a TFT (thin film transistor) substrate (lower substrate).

The first substrate 30a and the second substrate 30b may be a glass substrate or a plastic substrate. The plastic substrate may be a substrate for flexible displays, such as polyethylene terephthalate (PET), polycarbonate (PC), polyimide (PI), polyethylene naphthalate (PEN), polyether sulfone (PES), polyacrylate (PAR), cycloolefin copolymer (COC) substrates, and the like, without being limited thereto.

The first substrate 30a may include the optical film 10 stacked thereon. In addition, although not shown in the drawings, the second substrate 30b may also include the optical film 10 stacked on a lower surface thereof.

The optical film 10 may include a polarizing film 20 including a polarizer and a protective film thereon.

Further, although not shown in the drawings, the optical film 10a may further include typical adhesive layers, anti-reflective layers, hard coating layers, and the like.

The liquid crystal layer 40 may be a liquid crystal layer including liquid crystals of a vertical alignment (VA) mode.

The vertical alignment (VA) mode may include a multi-domain vertical alignment (MVA) mode in which ridges each including electrode pairs are formed on surfaces of the first and second substrates adjacent to the liquid crystal layer to form a multi-domain, a patterned vertical alignment (PVA) mode, in which a multi-domain structure is formed in application of voltage to patterned electrodes, a vertical alignment mode using chiral additives, and the like. Here, a cell gap of a liquid crystal cell may range from 2 μm to 8 μm.

Hereinafter, the present invention will be explained in more detail with reference to the following examples and comparative examples. It should be understood that these examples are provided for illustration only and are not to be in any way construed as limiting the present invention.

Mode for Invention

Detailed components of adhesive compositions used in the following examples and comparative examples were as follows.

EXAMPLES

Examples 1-8

A thermoplastic resin RX4500 (JSR Co., Ltd.) was subjected to melt extrusion through a T die at a temperature of 230° C. to 280° C., and passed between a FSR roll (first roll) and a metal roll (second roll) to form a film. Here, the FSR roll and the metal roll were driven at a speed ratio of the FSR roll speed to the metal roll speed of 1.01:1 to 1.03:1. An extruded film was stretched in a transverse direction (TD) by 12% relative to a machine direction to form an optical film having a thickness of 80 μm to 90 μm. Under the same conditions, the surface temperatures of the FSR roll and the metal roll were changed as in Table 1.

Comparative Examples 1-12

An optical film was prepared in the same manner as in Examples 1 to 8 except that the surface temperatures of the FSR roll and the metal roll were changed as shown in Table 1.

TABLE 1

|  |  | Extrusion temperature (° C.) | Surface temperature of roll (° C.) | Average β angle after extrusion (°) | Average β angle after stretching (°) | Upper viewing angle/Lower viewing angle (°) | Ro' (nm) | Rth' (nm) | CR |
|---|---|---|---|---|---|---|---|---|---|
| Example | 1 | 250 | 105 | 28 | 15.0 | 50~88/85 | 50 | 150 | 1300 |
|  | 2 | 250 | 110 | 29 | 16.0 | 50~88/85 | 60 | 150 | 1300 |
|  | 3 | 250 | 112 | 29 | 17.0 | 50~88/85 | 60 | 150 | 1500 |
|  | 4 | 250 | 115 | 30 | 19.0 | 50~88/85 | 70 | 160 | 1700 |
|  | 5 | 250 | 117 | 29 | 17.0 | 50~88/85 | 60 | 150 | 1400 |
|  | 6 | 250 | 119 | 29 | 17.0 | 50~88/85 | 50 | 150 | 1400 |
|  | 7 | 250 | 120 | 28 | 17.0 | 50~88/85 | 50 | 140 | 1500 |
|  | 8 | 250 | 123 | 28 | 15.0 | 50~88/85 | 50 | 130 | 1500 |
| Comparative Example | 1 | 250 | 70 | 0 | 0 | 20~40/40~60 | 40 | 110 | 1200 |
|  | 2 | 250 | 75 | 0 | 0 | 20~40/40~60 | 40 | 110 | 1300 |
|  | 3 | 250 | 80 | 0 | 0 | 20~40/40~60 | 40 | 110 | 1200 |
|  | 4 | 250 | 85 | 0 | 0 | 20~40/40~60 | 40 | 110 | 1400 |
|  | 5 | 250 | 90 | 0 | 0 | 20~40/40~60 | 40 | 110 | 1100 |
|  | 6 | 250 | 95 | 0 | 0 | 20~40/40~60 | 40 | 110 | 1000 |
|  | 7 | 250 | 100 | 0 | 0 | 20~40/40~60 | 40 | 110 | 1300 |
|  | 8 | 250 | 125 | 1~3 | 0 | 20~40/40~60 | 40 | 110 | 1500 |
|  | 9 | 250 | 128 | 1~3 | 0 | 20~40/40~60 | 40 | 110 | 1400 |
|  | 10 | 250 | 130 | 1~3 | 0 | 20~40/40~60 | 40 | 110 | 1500 |
|  | 11 | 250 | 133 | 1~3 | 0 | 20~40/40~60 | 40 | 110 | 1300 |
|  | 12 | 250 | 135 | 25 | 15.0 | 50~88/85 | 60 | 150 | 850 |

Property Evaluation (1) For each of the prepared optical films, nx, ny' and nz' were measured using an AxoSscan™ Polarimeter, and Ro' and Rth' were calculated by Equations 1 and 2:

$$Ro' = (nx - ny') \times d \qquad \text{[Equation 1]}$$

wherein nx and ny' are refractive indices in x-axis and y'-axis directions, respectively, and d is film thickness; and $$Rth'=[(nx+ny')/2-nz']\times d \quad \text{[Equation 2]}$$

wherein nx, ny' and nz' are refractive indices in x-axis, y'-axis and z'-axis directions, respectively, and d is film thickness.

(2) Average β angle: AxoSscan™ Polarimeter was used for measurement of the average β angle. The average β angle was obtained by an average value of β angles distributed in the thickness direction of the optical film.

To investigate a detailed thickness profile in the thickness direction, a luminance distribution of a polarizing microscope image according to angle was analyzed using an image analysis program, and after dividing the film into 9 sections by a distance of about 10 μm in the thickness direction of the film, average luminance was calculated. Next, after plotting the angle and the average luminance values, the film β angle was calculated. After plotting β angle distribution according to each thickness, the average β angle was calculated.

(3) Viewing angle: Viewing angle was measured at a side angle at which CR is 10 or more using EZ contrast (4) Contrast ratio (CR): Contrast ratio is a luminance ratio of a white screen to a black screen under the condition that a polarizing film is attached to a liquid crystal panel, and was measured using an EZcontrast™ viewing angle instrument.

Table 1 demonstrates that the optical films prepared in Examples 1 to 8 have superior viewing angles to the viewing angles of the optical films prepared in Comparative Examples 1 to 11. In addition, it could be seen that the optical film prepared in Comparative Example 12 had lower CR than the optical films of the examples although the optical film of Comparative Example 12 could have a similar viewing angle to the optical films prepared in the examples.

Figure 6:
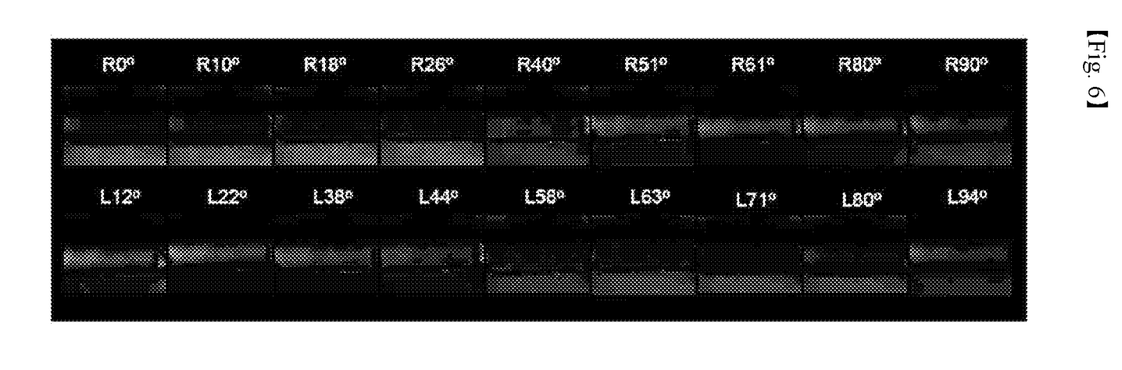
FIG. 6 shows polarizing microscope images of an optical film prepared in Example 4.

After epoxy molding of the optical film prepared in Example 4, the film was subjected to microtome-fragmentation to a film thickness of 100 μm and a fragment thickness of 40 μm using a glass knife. The fragments were placed on a glass sheet, which in turn was placed between crossed nicols polarizing plates and observed as to alignment according to angle under a polarizing microscope. Polarizing microscope images are shown in FIG. 6. As can be clearly recognized from the results of microscopic analysis, the film has a minimum luminance at +18° and −71°. These results are almost identical to measurements at a β angle of about 20° in the machine direction (MD) using an AxoScan™ Polarimeter.

Figure 7:
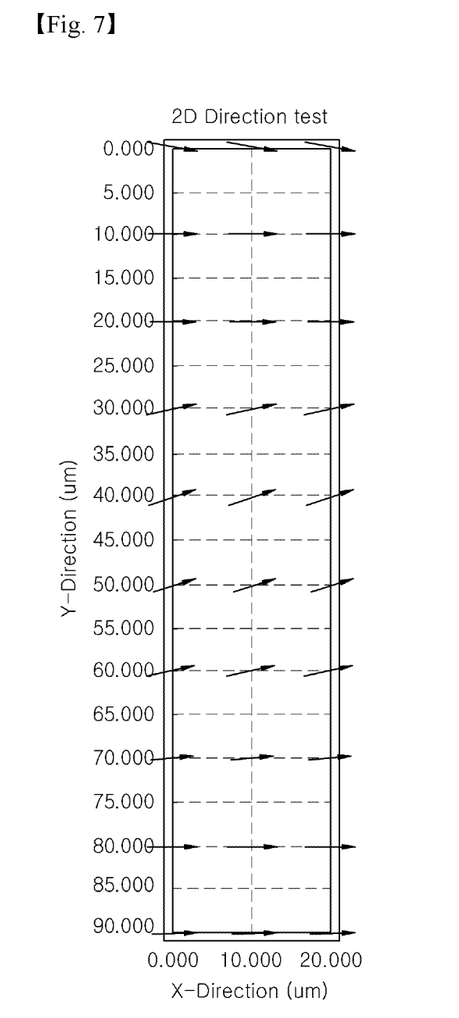
FIG. 7 shows optical axis director in a thickness direction of an optical film prepared in Example 4.
Figure 8:
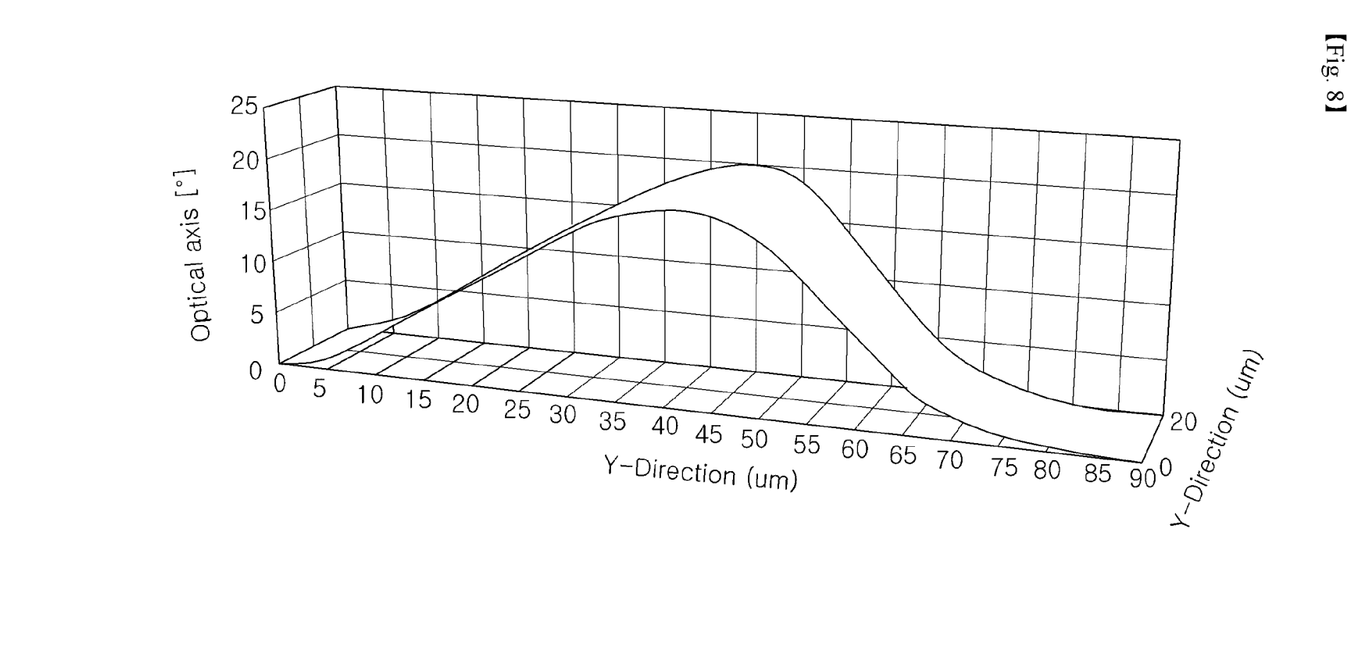
FIG. 8 shows optical axis data in a thickness direction of an optical film prepared in Example 4.

A beta profile of the optical film prepared in Example 4 was analyzed. For the cross section of the optical film, optical axis was analyzed using an Optipro™ Polarimeter manufactured by Shintech Inc., and the results are shown in FIGS. 7 and 8. FIG. 7 illustrates optical axis director in a thickness direction of an optical film prepared in Example 4. FIG. 8 illustrates optical axis data in a thickness direction of an optical film prepared in Example 4. The Y-direction in FIGS. 7 and 8 is a thickness direction and X-direction is a MD (machine direction) of the film. As a result of analyzing according to the thickness of the film at the position of 0 μm, 10 μm, 20 μm in X-direction, the surface of the film is not tilted aligned, but the inner part of the film is aligned with a tilt as shown in FIG. 7. Further, as shown in FIG. 8, the position at 45 μm in Y direction exhibits a maximum β angle (20°).

Those skilled in the art will understand that the present invention is not limited by the aforementioned embodiments and the drawings, and that various modifications, changes, and alterations can be made without departing from the spirit and scope of the invention. Therefore, these embodiments are provided for illustration only and are not to be construed in any way as limiting the present invention.

The invention claimed is:

1. An optical film being a single film of a non-liquid crystalline thermoplastic resin, the single film comprising:
   first and second surface parts on both surfaces of the single film in a thickness direction; and
   an inner part of the single film between the first surface part and the second surface part,
   wherein the first and second surface parts are not aligned with a tilt in the thickness direction, the inner part of the single film is aligned with a tilt in the thickness direction, and the first and second surface parts and the inner part of the single film have the same thermoplastic resin composition.

2. The optical film according to claim 1, wherein each of the first and second surface parts has a thickness of 1 μm to 20 μm from the surface thereof.

3. The optical film according to claim 1, wherein the first and second surface parts occupy 1% to 30% of a total thickness of the optical film.

4. The optical film according to claim 1, wherein the inner part of the single film has a film β angle of 5° to 35°, as defined as an angle at which transmittance under crossed nicols is minimized.

5. The optical film according to claim 4, wherein the inner part of the single film has a ratio of a maximum β angle (β1) to a minimum β angle (β2)(β1/β2) of 1:1 to 7:1.

6. The optical film according to claim 4, wherein the thermoplastic resin comprises at least one of cycloolefin resins, polycarbonate resins, polyolefin resins, aromatic vinyl resins, polyamide resins, polyimide resins, polyester resins, and acrylic resins.

7. The optical film according to claim 1, wherein the inner part of the single film has a thickness of 5 μm to 100 μm.

8. The optical film according to claim 1, wherein the optical film has an in-plane retardation value (Ro') of 20 nm to 110 nm at a wavelength of 550 nm, as defined by Equation 1:

$$Ro'=(nx-ny')\times d, \quad \text{[Equation 1]}$$

wherein nx and ny' are refractive indices in x-axis and y'-axis directions, respectively, and d is film thickness.

9. The optical film according to claim 1, wherein the optical film has an out-of-plane retardation value (Rth') of 80 nm to 190 nm at a wavelength of 550 nm, as defined by Equation 2:

$$Rth'=[(nx+ny')/2-nz']\times d, \quad \text{[Equation 2]}$$

wherein nx, ny' and nz' are refractive indices in x-axis, y'-axis and z'-axis directions, respectively, and d is film thickness.

10. The optical film according to claim 1, wherein the optical film has a thickness of 30 μm to 110 μm.

11. A liquid crystal display comprising:
   a polarizing film; and
   the optical film according to claim 1 stacked on the polarizing film.

12. The liquid crystal display according to claim 11, further comprising: a liquid crystal layer on another surface of the optical film.

13. A method for preparing the optical film of claim 1, the method comprising:

melt extruding the non-liquid crystalline thermoplastic resin; and passing the melt extruded thermoplastic resin between a first roll and a second roll to form the optical film, wherein the first and second rolls have a surface temperature lower than a glass transition temperature of the thermoplastic resin, and impart the tilt angle to the inner part of the film by generating a different shear force on the first and second surface parts of the optical film than in the inner part of the optical film depending on operation of the first and second rolls.

14. The method according to claim 13, wherein the first and second rolls have a surface temperature (Tr) satisfying Equation 3:

$$Te \times 0.4 < Tr < Te \times 0.5, \quad \text{[Equation 3]}$$

wherein Te is a temperature of the thermoplastic resin immediately after melt extrusion, and Tr is a surface temperature of the rolls.

15. The method according to claim 13, wherein the first and second rolls have different elasticities.

16. The method according to claim 13, further comprising: stretching the thermoplastic resin having passed between the first and second rolls.

17. The method according to claim 16, wherein the thermoplastic resin is stretched in a transverse direction (TD) by 5% to 20% relative to a machine direction.

18. The method according to claim 16, wherein the thermoplastic resin is stretched at a temperature lower than a glass transition temperature (Tg) thereof.

* * * * *